United States Patent
Hatazawa et al.

(10) Patent No.: US 6,239,851 B1
(45) Date of Patent: May 29, 2001

(54) PLANAR LIGHT SOURCE DEVICE HAVING POLARIZATION SEPARATOR FORMED OF TWO SHEETS WITH MATING TRIANGULAR PRISMS AND DIFFERENT INDICES OF REFRACTION

(75) Inventors: Tsuyonobu Hatazawa; Hideki Hayashi, both of Kyoto; Kozo Nakamura, Saitama; Takashi Watanabe, Kyoto; Johji Mamiya, Tokyo; Masaru Suzuki, Kanagawa; Hiroshi Tanase, Tokyo, all of (JP)

(73) Assignees: IBM Corporation, Armonk, NY (US); Sekisui Kagaku Kogyo Kabushiki, Osaka-Fu (JP)

( * ) Notice: Subject to any disclaimer, the term of this patent is extended or adjusted under 35 U.S.C. 154(b) by 0 days.

(21) Appl. No.: 09/051,504

(22) PCT Filed: Sep. 27, 1996

(86) PCT No.: PCT/JP96/02822

§ 371 Date: Jul. 6, 1998

§ 102(e) Date: Jul. 6, 1998

(87) PCT Pub. No.: WO97/14075

PCT Pub. Date: Apr. 17, 1997

(30) Foreign Application Priority Data

Oct. 12, 1995 (JP) .................................................... 7-263945
Dec. 7, 1995 (JP) .................................................... 7-318922
May 30, 1996 (JP) .................................................... 8-136997

(51) Int. Cl.[7] ............................ G02F 1/1335; G02B 5/30; G01D 11/28; F21V 7/04
(52) U.S. Cl. ............................. 349/62; 349/65; 359/487; 359/488; 362/26; 362/31
(58) Field of Search ........................... 349/62, 65; 362/26, 362/31; 359/487, 488

(56) References Cited

U.S. PATENT DOCUMENTS

| 4,798,448 | 1/1989 | van Raalte ........................... 362/268 |
| 5,381,278 | 1/1995 | Shingaki et al. . |

(List continued on next page.)

FOREIGN PATENT DOCUMENTS

| 0 704 655 A1 | 4/1996 | (EP) . |
| 0 750 209 A1 | 12/1996 | (EP) . |

(List continued on next page.)

*Primary Examiner*—Walter Malinowski
(74) *Attorney, Agent, or Firm*—Earl C. Hancock; Francis A. Sirr; Holland & Hart LLP

(57) ABSTRACT

The purpose of the invention is to provide a light guide of a variety of forms having a uniform distribution of brightness in the plane and a planer light source device for a liquid crystal display device which uses such light guide. The light guide comprises a first surface which is a surface to which a natural polarization light is incident and a second surface other than the first surface which is an exit surface of a specific polarization light into which, said natural polarization light is modulated, wherein;

said light guide has an interface of two materials of different indices of refraction oriented at an angle of $\theta B +/- \alpha$ degrees relative to the primary propagation direction of said incident light, said $\theta B$ being an angle satisfying Brewster's condition, more than two orientations of said interface exist in a single light guide, and the difference between the indices of refraction of the two materials of different indices of refraction is between 0.001 and 1.0. $\theta B$ is typically about 45 degrees. The light guide comprises a first transparent member having a plurality of upwardly convex right angle isosceles triangles on a first surface thereof and a first index of refraction and a second transparent member having a plurality of downwardly convex right angle isosceles triangles on a second surface thereof and a second index of refraction, and said first surface and said second surface contact each other.

13 Claims, 9 Drawing Sheets

U.S. PATENT DOCUMENTS

| | | | |
|---|---|---|---|
| 5,712,694 | * 1/1998 | Taira et al. | 349/62 |
| 5,764,322 | 6/1998 | Mamiya et al. | 349/65 |
| 5,982,540 | * 11/1999 | Koike et al. | 349/62 |

FOREIGN PATENT DOCUMENTS

| | | |
|---|---|---|
| 2272277 | 5/1994 | (GB) . |
| 5-11217 | 1/1993 | (JP) . |
| 5-210098 | 8/1993 | (JP) . |
| 6-27420 | 2/1994 | (JP) . |
| 6-95106 | 4/1994 | (JP) . |
| 07-064085 | 3/1995 | (JP) . |
| 9-5739 | 1/1997 | (JP) . |

* cited by examiner

PLANAR LIGHT SOURCE DEVICE HAVING POLARIZATION SEPARATOR FORMED OF TWO SHEETS WITH MATING TRIANGULAR PRISMS AND DIFFERENT INDICES OF REFRACTION

TECHNOLOGICAL AREA

This invention relates to a plane light source device which emits light uniformly from a plane having a given area using a light source of unpolarized light (natural light) like a light from a fluorescent lump, and an optical guide used for such light source device. The plane light source device and the optical guide are typically incorporated in a back light module of a liquid crystal display device.

BACKGROUND TECHNOLOGY

A plane light source device in the prior art has been so designed that an emitting light is bright and comfortably perceived by an observer because it was dispersed and collected by means of an optical dispersing sheet or a prism sheet.

However, it is not true that 100% of the emitted light from a back light was actually emitted to a person who observes the display surface. Particularly, a polarizer allows only one of orthogonal P and S components to pass it while inhibiting the other component by absorbing it so that about 50% of the light is lost. In order to reduce the loss resulted from the polarizer, a polarization separator and a phase converter have been used.

A light incident to a polarizer can be polarized in advance by means of a polarization separator and a phase converter so that the utilization of light is improved by polarizing the light into one which can pass the polarizer.

A plane light source device is proposed in PUPA 7-64085 which has a polarization separator provided on the light emitting surface side of a light guide, the separator comprising a prism array having a ridged surface the cross-section of which is triangular or W shaped and one or more dielectric interference films laminated on the ridged surface. In this device, the light emitted from the light guide is separated into S and P components at the interface between the prism array and the dielectric interference film, or the interface between the dielectric interference films to allow one of the components (P component) to pass the polarization separator while reflecting the other component (S component) back to the light guide after repeated full reflections. The reflected light is again dispersed by a light dispersing sheet or printed dots (light dispersing members) of the light guide into de-polarized light for re-utilization of the light. Though the light is not perfectly separated into S and P components, the device is so designed as to emit one of the components more than the other component so that the quantity of light passing through the polarizer can be increased.

It is essential to this device that the light emitted out of the light guide is incident orthogonally to the prism array so that the utilization efficiency of the light is not sufficient when the light passes the dispersing sheet placed between the light guide and the prism array because it is difficult to make the light incident orthogonal to the prism array.

PUPA 6-27420 disclosed a technique in which the incident light is separated into S and P components by means of a polarized beam splitter, passing the S component through a half wave length plate to convert it to P component, and combining it with the inherent P component by means of a condenser lens for incidence to a liquid crystal cell by means of a concave mirror. This allows the portion of the polarized light (P component in this case) effectively utilized to be increased because the S component contained in the incident light is converted to a P component for combination with the inherent P component for incidence to the liquid crystal cell.

Though this technique successfully separates the light into S and P components and converts the S component to a P component for combination with the inherent P component, it is necessary that a certain distance is maintained between the concave mirror and the condenser lens, and between the concave mirror and the liquid crystal. Further, because expensive optical components, such as a beam splitter and a condenser lens, are required, they are not suitable for use in a back light of a liquid crystal display.

Further, the prior art technique involved a problem in that the S and P components which were separated from the unpolarized light became elliptically or circularly polarized in passing through a medium by virtue of the phase difference of the medium.

To resolve the above problem, the part of the inventors of this invention disclosed in a patent application number 7-155735 an entirely novel light guide and a plane light source device. This invention is an improvement to the invention disclosed in the above cited application.

It is an object of this invention to provide a light guide having a very high light utilization efficiency and a plane light source device which uses such light guide.

It is another object of this invention to provide a light guide of a variety of forms using the principle which is same as the light guide of the above first object.

It is a still another object of this invention to provide a plane light source device having more uniform emitting intensity with reduced variation of the plane intensity distribution over the distances from the light source.

It is a further object of this invention to provide a plane light source device which enables the light from the light source to be incident to the light guide at an ideal angle of incidence.

It is a still further object of this invention to provide a liquid crystal display device having a high brightness and image quality by using the light guide or the plane light source device which meets the above objects.

DISCLOSURE OF THE INVENTION

The above described objects of this invention are achieved by a light guide comprising a first surface which is an incident surface to which is incident a natural polarization light and a second surface other than said first surface which is an emitting surface emitting a light of a specific polarization that is polarized from the natural polarization light, in which an iterface between two materials having different indics of refraction is oriented in an angle satisfying Brewster's condition $(\theta_B)+/-10$ degrees with respect to the principal propagation direction of the incident light, there are at least two such orientation of the interface in the light guide, and the difference between the indices of refraction of the two materials is 0.001–1.0. $\theta_B$ is normally about 45 degrees when the light is incident normally to the incident surface but this is a matter of choice depending on the angle of incidence of the incident light. Typically, the light guide of this invention comprises a first transparent material of a first index of refraction having at the first surface a plurality of upward convex ridges and a second transparent material of a second index of refraction having at the second surface a plurality of downwardly convex ridges, with the first and the second surfaces contacted each other to form an interface.

A plane light source device may be structured by using the light guide. The plane light source device typically comprises a source of natural light, the above described light guide of this invention having a first surface as a light incident surface which is adjacent to the light source and a second surface orthogonal to the first surface which emits a light of specific polarization in the light from the light source in the direction which is normal to the second surface, a first optical reflection means provided adjacent to a third surface which is opposite to the first surface of the light guide, a polarization converter means intermediate the light guide and the first optical reflecting means to shift the phase of the light passing through the light guide by 90 degrees, and a second optical reflecting means provided adjacent to a fourth surface which is opposite to the second surface of the light guide.

BEST MODE OF PRACTICING THIS INVENTION

The plane light source device of this invention requires (a) a light source (including light collecting means), (b) polarization separator means, and (c) a polarization converter means. The light guide of this invention provides the polarization separation function (b) when used in the plane light source device.

Figure 1A:
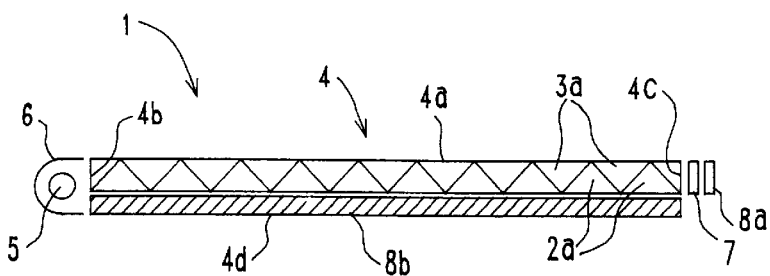
FIG. 1 is schematic diagram of a first embodiment of this invention.
Figure 1B:
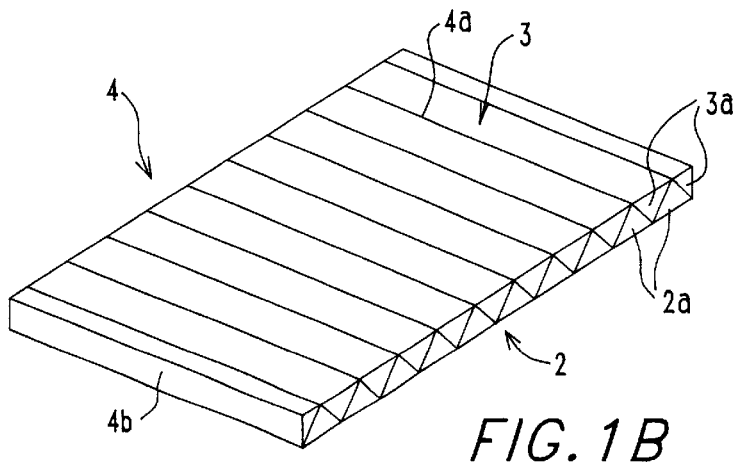

FIG. 1 shows a schematic diagram of a basic plane light source device 1 of this invention (the first embodiment). In FIG. 1, a fluorescent lump 5 is generally used as the light source. The fluorescent lump 5 has a function to emit a light to the incident surface 4b of the light guide 4 which is the (b) polarization separator means.

A lump reflector 6 is positioned at the side of the fluorescent lump 5 opposite to the light guide 4. The lump reflector 6 prevents the light from the fluorescent lump 5 from scattering to the directions other than the light guide 4.

The light guide 4 of this invention functions as (b) polarization separator means. The polarization separation function is provided by using the principle of Brewster angle. The Brewster angle as used herein is an angle between the direction of an incident light and the normal to the media interface when the intensity of reflection of P component is zero, when the light is incident at a given angle to the interface of two materials (hereinafter called medium interface) having different indices of refraction.

A process of deriving the Brewster angle is briefly described below. When a light is incident to the interface, reflection of P and S components are given by the following expressions.

$$R\rho = \{n_1/\cos\theta_1 - n_0/\cos\theta_0\}^2 / \{n_1/\cos\theta_1 + n_0/\cos\theta_0\}^2 \quad (1)$$

$$Rs = \{n_1/\cos\theta_1 - n_0/\cos\theta_0\}^2 / \{n_1/\cos\theta_1 + n_0/\cos\theta_0\}^2$$

Where $R\rho$ and $Rs$ are the reflectance of the intensity of P and S components, respectively, $n_0$ and $n_1$ are the index of refraction in incident side and exit side, respectively, and $\theta_0$ and $\theta_1$ are the incident and exit angles, respectively.

From the expression (1), an incident angle $\theta_B$ where $R\rho=0$, i.e., exiting P component zero is supposed to exist.

Putting the numerator =0, $$n_1/\cos\theta_1 = n_0/\cos\theta_0$$

On the other hand, by Snell's law, $$n_1 \sin\theta_1 = n_0 \sin\theta_0$$

By putting together, Brewster angle $\theta_B=$ $$\sin^{-1}[1/\{(n_0/n_1)^2+1\}^{1/2}]$$

Figure 20:
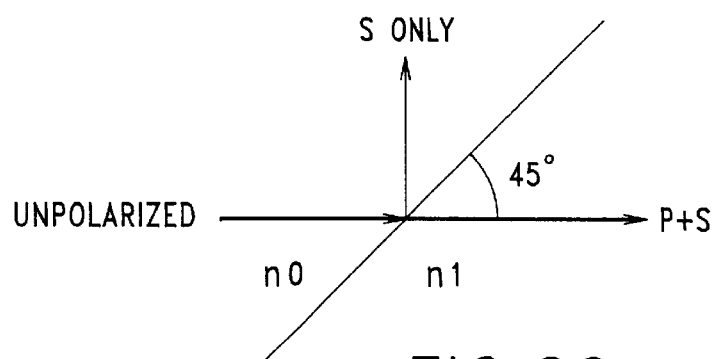
FIG. 20 is a diagram relating to the principle of this invention.

It is seen from this expression that $\theta_B=45$ degrees when n, is substantially equal to no. Thus, by orienting the angle of the interface between the media in 45 degrees with respect to the direction of incidence and making the indices of refraction of the two media close to each other, ideally, only a portion of S component will be reflected to the direction in right angle to the direction of incidence with the rest of S component and entire P component passing the interface between the media. The principle of this is explained in detail with reference to FIG. 20. The light emitted from the light source is a natural polarization light without having any specific polarization. The natural polarization light is incident at right angle to the incident surface of the light guide and to the interface between a medium having an index of refraction $n_0$ (hereinafter named "medium A") and a medium having an index of refraction $n_1$ (hereinafter named "medium B"). Then a few percents of light is reflected from the interface between the media but, when the incident angle to the interface is Brewster angle, S component is reflected from the interface to the direction right angle to the incident direction (toward the upper surface of the light guide). On the other hand, the light passing through the interface is a natural polarization light which includes S component subtracted by the amount of reflected light and P component. The light then passes through the next interface located forward in the direction of the propagation of the light. At the next interface, a few percents of S component is again split and reflected toward the top surface of the light guide. The light then proceeds to the next interface. In such manner, the natural polarization light incident to the incident surface will have S component progressively decreased each time it passes through the interface and be directed to the end surface of the light guide which is opposite to the incident surface. Eventually, only P component will reach the opposite end surface. In this way, the incident natural polarization light is completely split into S and P components in the light guide of this invention. This is referred to as a polarization split function of the light guide.

It is required for the light guide of this invention to reflect preferably only S component solely and to provide a uniform distribution of intensity over the surface without depending on the distance from the light source. To meet this requirement, each ridge on the ridged surface of a transparent resin sheet comprising the light guide is either in a shape of triangular column or a triangular column having the apex thereof rounded. In the former, the cross section of the surface side of the ridged surface is generally in a shape of triangular wave or W shape. In the latter, it is generally in a shape of sin curve. When a triangular column is adopted as a shape of the ridge, the angle between the slopes of the cross sectional triangle is between 30 to 60 degrees. This is because the light emitted from the light source has a certain degree of divergence so that a single angle can not be chosen so as to make Brewster angle. However, because the angle in which a maximum amount of light is incident to the light guide from the light source (including light reflected by a reflector, hereinafter) is in a direction right angle to the incident surface (the end surface in the side where the light source is placed) and the light has to be emitted toward a liquid crystal display device which is placed in the light emitting side of the light guide, it is desirable to orient the angle of lamination in 45 degrees at the interface between two media comprising the light guide, i.e., a transparent sheet and a transparent resin laminated therewith. When Brewster angle is 45 degrees, the difference of the indices of refraction between the two media ($\Delta n$) is zero which makes the interface absent so that a reflection per se does not exist. Therefor, it is desirable to choose media such that $\Delta n > 0.001$. It is also required from an aspect of manufacturing engineering and practicality that $\Delta n < 1.0$. From the above reason, it is considered preferable that $0.001 < \Delta n < 1.0$ and, more preferably, $0.001 < \Delta n < 0.2$.

The above strategy of a light guide is embodied in the light guide 4 in FIG. 1 (B) (embodiment 1). A sheet material 2 made of a transparent acrylic resin (index of refraction n=1.49) has on one surface thereof a plurality of triangular columns 2a having a cross section of an isosceles triangle in which the apex angle is 90 degrees and 3 sides are 1 mm, 1 mm and $2^{1/2}$ mm lengths, respectively. Another sheet material 3 made of a transparent photo setting resin (the index of refraction=1.53) has on one surface thereof a plurality of triangular columns 3a having a similar shape to the triangular columns 2a. The two sheets are formed into a plate member having 16.5 cm width, 21.5 cm length and $\frac{1}{2}^{1/2}$ cm thickness such that the triangular columns 2a of the acrylic resin sheet 2 engage the triangular columns 3a of the photo setting resin sheet 3 each other with the former being upwardly convex while the latter being downwardly convex. The face of side edge portions (the edges in the direction extending along the length of the triangular columns 2a and 3a) of the plate member are worked into edge surfaces which are in right angle to the surface of the plate member to complete a light guide 4. The light is incident to the side surface 4b of thus formed light guide 4 and exits from the flat surface 4a in the side of the photo setting resin sheet 3. Hereinafter, the former is called an incident surface while the latter is called an exit surface.

Figure 21:
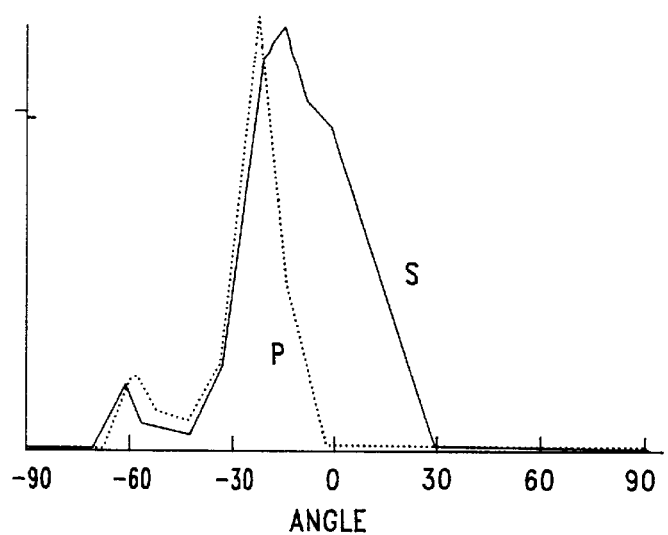
FIG. 21 shows a variation of emitting angles when the swing of the incident light is +/−80 degrees.
Figure 22:
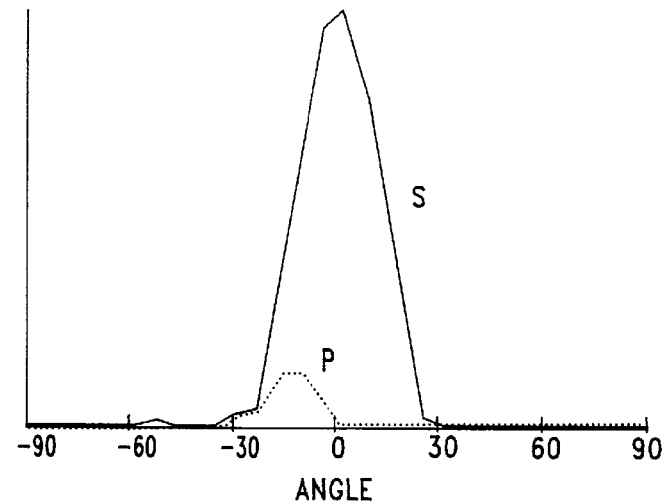
FIG. 22 shows a variation of emitting angles when the swing of the incident light is +/−20 degrees.

It is desirable here that the exit angle (the angle which the direction of exit light makes relative to the normal of the exit surface) preferably concentrates to zero degree for use in a back light of a liquid crystal display device. The distribution of the exit angle depends on the distribution of the incident angle from the light source. Accordingly, it is one of questions to what extent the divergence of the angle which the incident light from the light source makes relative to the normal of the incident surface (incident angle) is allowable. In this regards, FIG. 21 and FIG. 22 show the dependency between the divergence of incident angle and the divergence of exit angle. In FIGS. 21 and 22, the exit intensity from the exit surface (top surface of the light guide) is given by the ordinate while the exit angle is given by the abscissa. FIGS. 21 and 22 show the cases where the divergence of the incident angle of the incident light from the light source is +/−80 degrees and +/−20 degrees, respectively. According to these figures, with divergence of incident angle as much as +/−80 degrees, the center of the exit light is shifted to minus side from zero degree so that this case does not give a suitable light source. On the other hand, with divergence of incident angle of +/−20 degrees, the center of the exit light stays approximately around zero degree and contamination by P component is permissibly small so that it is seen that this case is suitably used for an ideal light source.

Based on the above data, the interface of media need not strictly match Brewster angle. For instance, assuming that divergence of incident light is allowable within +/−20 degrees, it is sufficient that the media interface is about $\theta_B$+/−15 degrees, and preferably about $\theta_B$+/−10 degrees. With such degree of precision, the percentage of P component contaminating into the exit light is so small that the utilization efficiency of the light is not remarkably reduced as shown in FIG. 22.

A light collecting member is not shown in FIG. 1(A) which relates to the embodiment 1. However, it is recommendable to place a light collecting member between the light source 5 and the light guide 4 to reduce the divergence of the incident angle of the light from the light source. This is for the purpose of collimating the light vector preferably to a same direction because a fluorescent lump is a linear light source which emits diffused light. If the direction of incidence to the light guide is not uniform, the polarization split function is not obtained with a sufficient efficiency due to the diverted angle of the incident light even if the angle of the two media is precisely adjusted to an angle which meets Brewster angle relative to the light coming from the direction which is in right angle to the incident surface of the light guide. It is preferable that the light collection means is typically one or more transparent resin sheets having a ridged surface placed between the fluorescent lump light source and the polarization split means. Examples of the light collecting means include a prism array having triangular ridges with apex angle being 40 to 100 degrees on the surface opposite to the light source and a cylindrical lens having a flat surface on one side thereof Examples of the light collecting means will be disclosed in several embodiments described later.

With reference to FIG. 1(A), a quarter wavelength plate 7 and a reflecting sheet 8a are placed adjacent to the end surface 4c of the light guide opposite to the incident surface 4b. The reflecting sheet 8a reflects the light in which only P component remains after S component has been removed from the light which is incident to the light guide 4 from the fluorescent lump 5 and re-enters again the light guide 4 from the end surface 4c.

Figure 23:
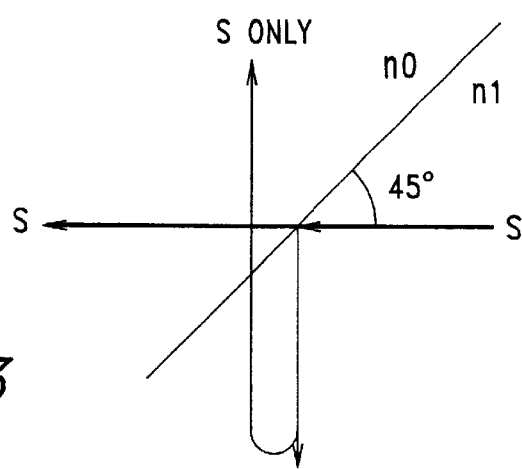
FIG. 23 is a diagram relating to the principle of this invention.

A quarter wavelength plate 7 which functions as (c) a polarization converting means is placed between the light guide 4 and the reflecting sheet 8a. P component passing sequentially the media interface in the light guide 4 is reflected by the reflecting means 8a after passing through the quarter wavelength plate 7 (emitted from the end surface 4c) and then passes through the quarter wavelength plate 7 again for re-entrance into the end surface 4c so that the phase is shifted 90 degrees because a phase conversion obtained is one which is equivalent to passing a ½ wavelength plate. Thus, the P component which has exited from the end surface 4c is converted into S component by the quarter wavelength plate 7 for re-entrance into the light guide 4 from the end surface 4c. A portion of the light re-entering the light guide 4 from the end surface 4c is reflected by the media interface by Brewster law toward the bottom surface of the light guide as shown in FIG. 23 and then reflected by a reflecting sheet 8b which is placed on the bottom surface of the light guide for exit from the exit surface 4a.

Figure 2:
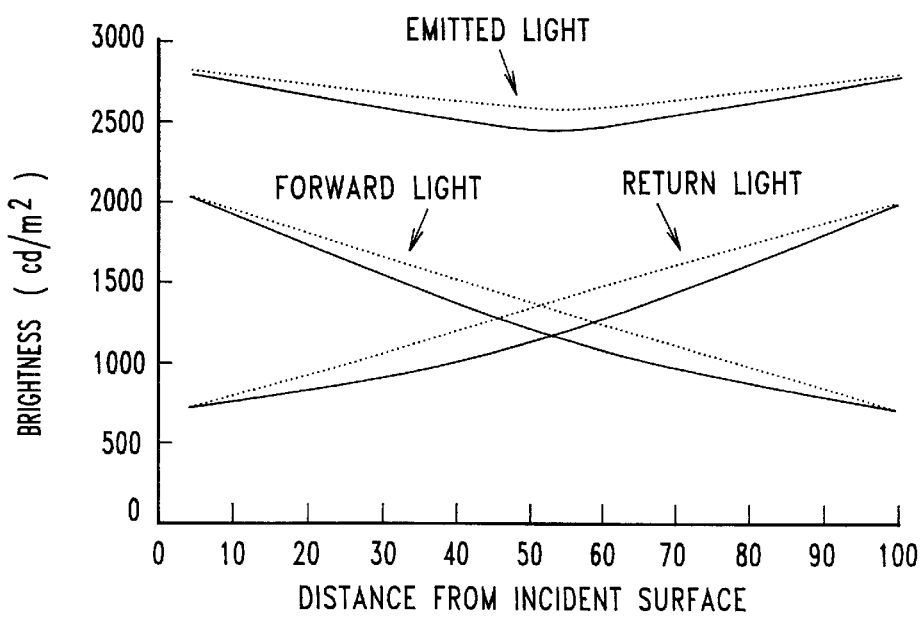
FIG. 2 is a schematic diagram showing a correlation between the distance from the incident surface and brightness.

The above is the basic principle of the light guide and the plane light source of this invention. With such system, substantially 100% of the light from the light source 5 can be utilized. Therefore, a higher transmittance is realized with less power consumption by using the plane light source of this invention in a liquid crystal By the way, it is desirable that the distribution of the light intensity emitted from the exit surface of the light guide is preferably uniform over the surface in order for this light guide to be used as a plane light source for a liquid crystal display device. To illustrate this, the brightness by the S component emitted from the top surface of the light guide is given in the ordinate while the distance from the surface to which the light is incident from the light source is given by the abscissa. In FIG. 2, the solid line shows the value measured without any means for making the brightness distribution uniform. "Outbound light" is the brightness of the S component from the light which is incident to the incident surface 4b of the light guide 4 from the light source 5 while "Inbound light" is the brightness of the light emitted from the top surface of the light guide resulting from the S component which is reflected by the reflecting sheet 8a and polarization converted by the quarter wavelength plate 7 for re-entrance into the light guide 4 and separated by the light guide 4. "Output light characteristic" is a composition of these two lights in which an area of relatively lower brightness is observed in the middle of the light guide.

Several methods are conceivable to compensate for the lower brightness in the middle portion. For example, in one of the embodiments of this invention, it is possible to increase the density of the triangular column interfaces provided on the surface of the sheet which forms the light guide while decreasing the thickness of the sheet in the middle area to increase the area of the media interface. By relatively increasing the area of the media interface in the middle, the S component separated increases correspondingly to the area resulting in an exit light of uniform distribution over the surface.

According to another embodiment, this problem is resolved by changing the difference of indices of refraction $\Delta n$ continuously or stepwise between the end portions and the middle portion of the light guide 4. By making $\Delta n$ at the middle portion of the light guide 4 greater than $\Delta n$ at the end portions thereof, the reflectance of S component is increased at the middle portion resulting in an exit light of uniform distribution over the surface.

In the following embodiments, a number of modifications of the above described embodiment 1 will be described together with the result of evaluation of them.

Embodiment 2

In the embodiment 2, one which is of a similar shape is prepared with different materials. That is, a light guide similar to the embodiment 1 is utilized in the plane light source except that the sheet material 2 was made from a transparent acrylic resin (index of refraction n=1.49) while the sheet material 3 was made from a transparent photo setting resin compound (index of refraction n=1.58) of triaryl isocyanate and thiol components, and the cross sectional shape of the triangular column of the array is a right angled isosceles triangle having 3 edges of $\sqrt{2}$ mm, $\sqrt{2}$ mm and 2 mm lengths.

Embodiment 3

Figure 3A:
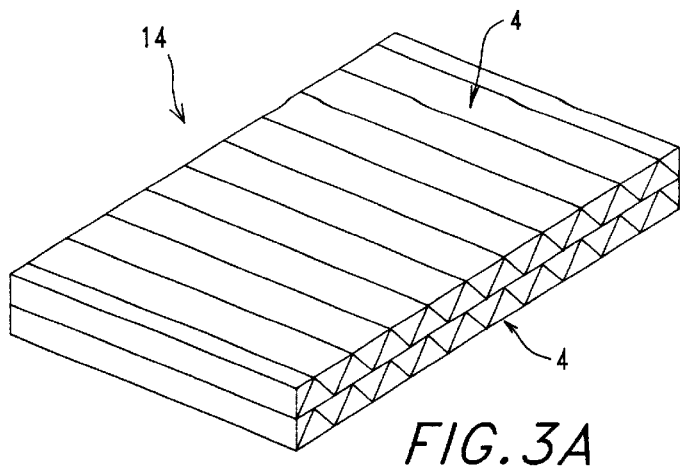
FIG. 3 is a schematic diagram of a third embodiment of this invention.
Figure 3B:
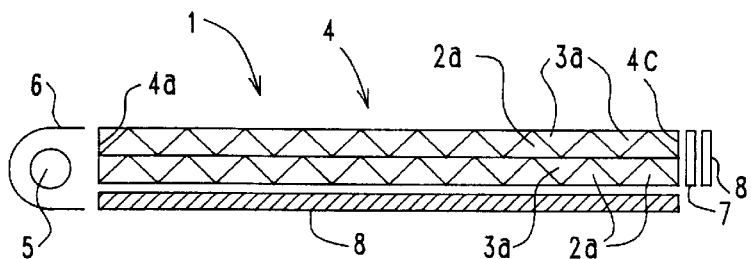

As shown in FIG. 3A, the embodiment 3 is prepared with two of the light guides of the embodiment 1 laminated in the direction of thickness. The plane light source 11 (FIG. 3B) using the lamination as a light guide 14 was evaluated. Portions of the plane light source 11 of the embodiment 3 shown in FIG. 3A which are same as the embodiment 1 are designated by same reference numbers. Details of other portions in FIG. 3B are same as FIG. 1 and is not described here.

In the above embodiments, no measure is taken to make the brightness distribution in the surface uniform. However, it is necessary for the brightness distribution to be uniform in order for the plane light source of this invention to be used as a back light for a liquid crystal display. The following three embodiments take this into consideration.

Embodiment 4

Figure 24:
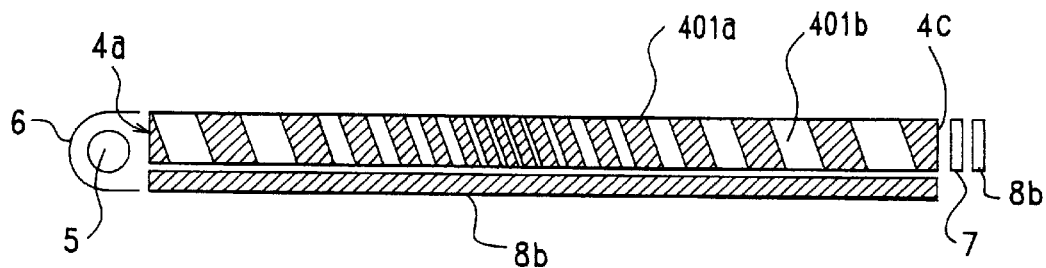
FIG. 24 is a schematic diagram of a 4th embodiment of this invention.
Figure 25:
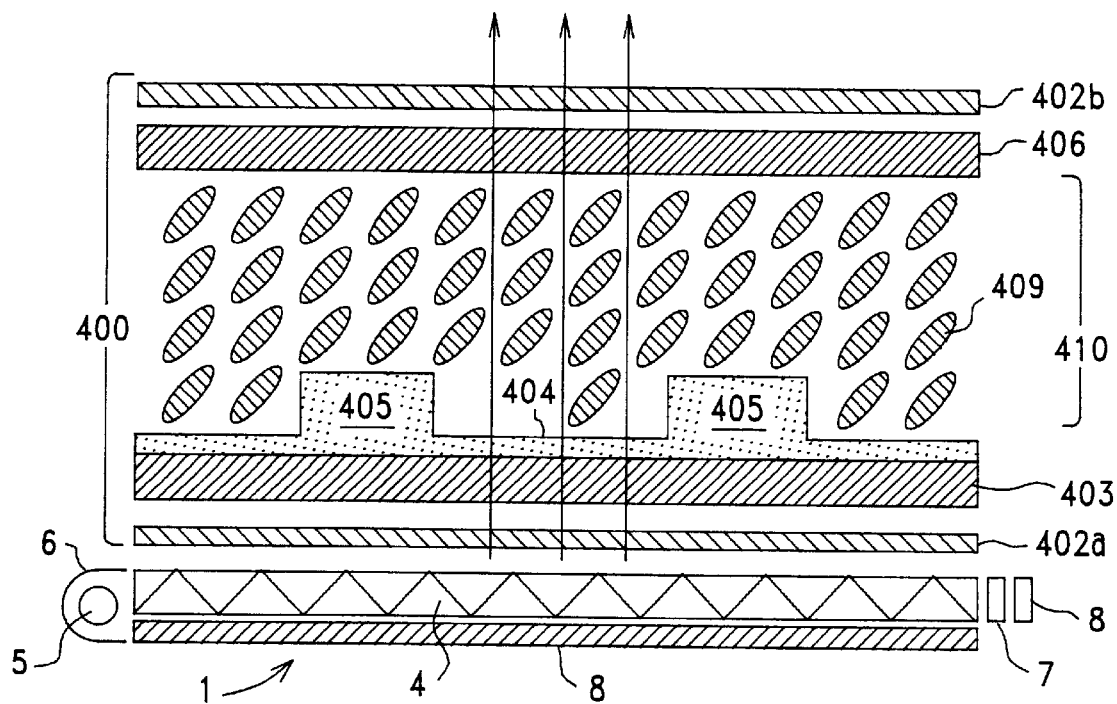
FIG. 25 is a schematic diagram showing the plane light source device when applied to a liquid crystal display device.

The embodiment 4 is shown in FIG. 24. The embodiment 4 comprises alternating laminations of media A and B so as to form media interface having a given angle. The thickness of the medium 401a and the medium 401b change stepwise or continuously. That is, the thickness of the medium is thickest at the end surfaces 4a and 4b while it is thinnest at the middle portion. The reason of changing the thickness of the medium is to increase the density of the media interfaces in the middle portion to provide uniform distribution of the surface brightness in the plane.

In more particular, 147 rectangular polycarbonate (PC) plates (n=1.5865) of 5.0 mm×16 cm are laminated in the order of 6 plates of 1.0 mm thickness, 19 plates of 0.5 mm thickness, 45 plates of 0.1 mm thickness, 26 plates of 0.2 mm thickness and 6 plates of 1.0 mm thickness with polymethyl methacrylate (PMMA) films sandwitched as a spacer between each PC plate. Here, the thickness of the PMMA film should substantially satisfy the expression given below according to a casting method.

$$(d_{pc}+d_{PMMA})=1.24(0.965^{n-1}+0.965^{147-n}) \text{ nm}$$

where; $d_{pc}$ and $d_{PMMA}$ are the thickness of the PC plate and the PMMA film, respectively, and n ($1 \leq n \leq 146$) is the nth layer of the lamination. An alternating lamination of the plates and spacers is held with a tilt angle of 45 degrees in a jig and the sides of shorter edges are fixed by heat sealing to yield an interface of about 45 degrees. The spacer films are then taken away and the assembly is immersed in a silicon based thermosetting resin (n=1.4125) made by Shinnetu Chemical Co. The PC plates are put in a vacuum oven together with the silicon resin layers which are filled into the gaps between the PC plates by evacuating the oven. This process also evacuates a gas from the resin. The sample is then heated in the oven at the temperature of 100° C. for 5 hours to set the resin. This was then cut into a rectangular piece of 16 cm×10 cm×3 mm size and finished into a light guide plate of 2.5 mm thickness by mirror grinding 6 surfaces. A fluorescent tube light source (3 mm outer diameter and 16 cm length) is placed in the edge opposing to the interface of the light guide plate (as to the direction of the interface, the exit surface side is the front side while the back side is in back as shown in the figure) and a lump reflector made of a PET film deposited with silver is provided around the fluorescent lump. In addition, a quarter wavelength plate is placed in the end surface opposite to the fluorescent lump and a reflecting sheet having a silver deposition is placed externally thereto. A similar reflecting sheet is provided in the bottom surface and the remaining two side surfaces of the light guide plate which are orthogonal to the direction of light propagation. The quarter wavelength plate used here is made of polycarbonate drawn in one axis (260 mm retardation and 65 μm). The plane light source so prepared is the embodiment 4 of this invention.

Embodiment 5

The embodiment 5 is similar to the plane light source 11 of the embodiment 3 except that the index of refraction n of the photo setting resin comprising the downwardly convex triangular column 3a which forms the light guide 14 is changed stepwise from 1.50 (end) through 1.53 (middle portion) to 1.50 (end) from the incident surface 4a to the opposite end surface 4c. This is intended to obtain a uniform brightness distribution in the surface by changing the difference Δn of the indices of refraction between the two media stepwise.

The light guide in this case was prepared in the following way. A photo setting resin is filled into a V-grooved die in a shape of an array of a plurality of rectangular columns and is coated by a transparent base member (polyethylene terephthalate). The entity is irradiated by a light from the top to form a sheet member for use as a light guide which has an array of a plurality of triangular columns on one surface. The sheet member is removed from the die together with the transparent base member and a photo setting resin having a different index of refraction is filled into the grooves between each triangular columns. During this process, a photo setting resin having an index of refraction which is close to that of the triangular column (n=1.50) is filled into the side which is near the end of the sheet member (the end which is assumed to be an incident surface in the light guide) and the index of refraction is progressively increased until a photo setting resin having an index of refraction which has a largest difference from that of the triangular column is filled in the middle portion of the sheet member and then the index of refraction is decreased stepwise toward the other end until the index of refraction n is 1.50 at the other end. Finally, a light is irradiated to complete the light guide. The plane light source thus formed is the embodiment 5.

Embodiment 6

Figure 4A:
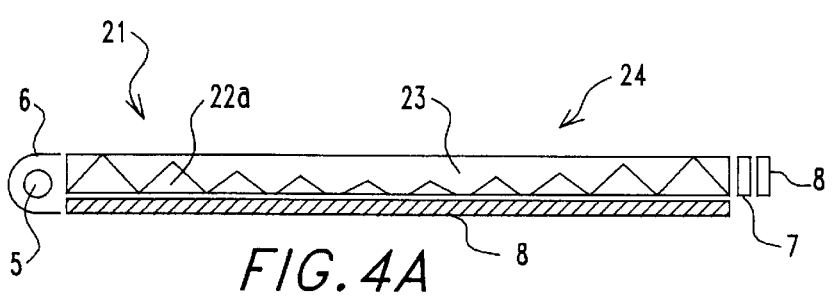
FIG. 4 is a schematic diagram of a 6th embodiment of this invention.

In the embodiment 6, a plane light source 21 was prepared which had a light guide 24 as shown in FIG. 4A in place of the light guide 4 of the embodiment 1. The feature of this light guide lies in that the area of the slope of the triangular column 22a is different between the ends and the middle portions of the light guide 24. In this case, a sheet member which has on one surface an array of a plurality of triangular columns 22a having a cross section of right angled isosceles triangle of different sizes is formed from a transparent acrylic resin (index of refraction n=1.49). The size of each triangular column is set such that the area of the slope of the triangular column 22a varies in the ratio of 5:3:5 from one end of the sheet member (left end in the figure) through the middle portion to the other end. A photo setting acrylic adhesive which has an index of refraction that is different by 0.04 from the acrylic resin forming the triangular column is filled into the V shaped groove between each triangular columns and set to produce a light guide 24 which has a flat light exit surface (the top surface in the figure) on the surface side of the triangular columns 22a made of the photo setting acrylic adhesive 23. A light source 5, a lump reflector 6, a quarter wavelength plate 7 and a reflecting sheet 8 are respectively placed in a predetermined condition with respect to the light guide 24 in a manner similar to the embodiment 1. The plane light source 21 thus formed is the embodiment 6. In this embodiment, the density of the media area varies between the ends and the middle portion of the light guide 24 by changing the area of the slope of the triangular column to provide a uniform brightness distribution in the surface.

Figure 4B:
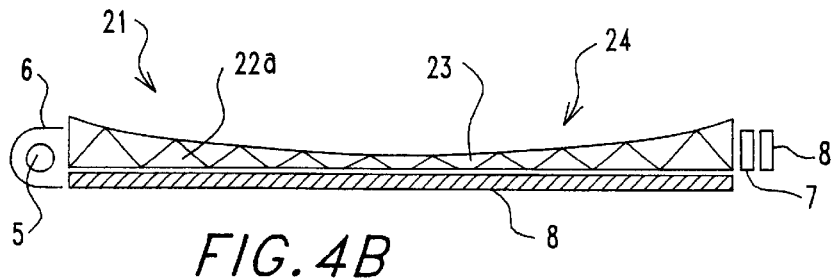

As a modification of the embodiment 6, one as shown in FIG. 4B is conceivable. In this modification, the thickness of the middle portion of the light guide is progressively decreased along the height of the triangular column. By taking this shape, there will be no light propagating without passing through the media interface so that a more improved utilization efficiency of the light is expected.

The reason why the area of the slope of the triangular column 22a is varied and the method of determining the rate of the variation is as follows. The height of the triangular column 22a having a right angled isosceles triangle, that is, the length in the direction orthogonal to the triangular cross section, depends on the size of a shorter edge or a longer edge of the light guide as seen from the light exiting side. When the size of the light guide is 10.4 inches, the length of the shorter edge in the light incident surface side is about 16.5 cm. On the other hand, the rate of variation of the height of the triangle of the cross section in the triangular column 22a is obtained by the following calculation.

The reflectance Rs of S component when a light passes through and is reflected by the medium of the triangular column 22a from the medium 23 (photo setting acrylic resin adhesive) which is filled between the triangular column 22a is;

$$Rs=[(n_1 \cos i - n_2 \cos r)/(n_1 \cos i + n_2 \cos r)]^2$$

where n1 and n2 are the index of refraction of the media, i is an incident (and reflecting) angle, and r is a (refraction) reflecting angle.

The index of refraction of each medium in this embodiment is 1.49 for the acrylic resin and 1.53 for the photo setting acrylic resin adhesive. The incident angle is 45 degrees because the light is incident to the slope of the triangular column 22a. By substituting the above expression to the following expression representing Snell' law;

$$\sin\theta_2/\sin\theta_1 = n_1/n_2$$

where $\theta_1$ is an incident angle while $\theta_2$ is a refraction angle, $\theta_2 = 43.5$.

Because $\theta_2 = r$, substitution of the above expression with respective values, including i=45 degrees, the reflectivity of S component Rs=0.07%. Because S component is attenuated by Rs for each media interface within the light guide, the amount of S component light passing is given by;

$$Ts = 0.95 \times (1-0.0007)^n \ (\%)$$

where 0.95 is a loss due to the reflection when the light is incident to the light guide from air and n is the number of interfaces.

Although it is desired in this case that the entire S component is reflected by the interfaces to utilize entire S component as an exit light from the exit surface of the light guide, some of the light can not be practically utilized due to the absorption of the light by the material. Assuming that 5% of S component is not utilized, and substituting the above expression Ts with this, $$Ts = 0.05 = 0.95 \times 0.9993^n$$

resulting in the number of interfaces n=3216. Because a single triangular column has two media interfaces, the number of all triangular columns is 3216/2=1608.

Figure 5:
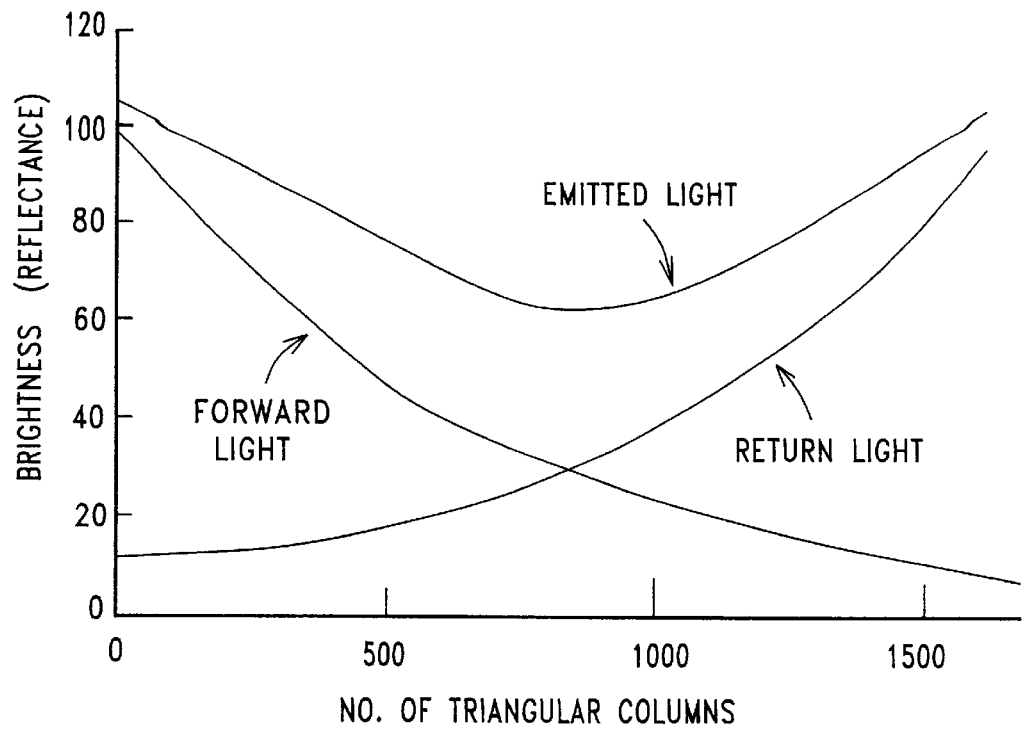
FIG. 5 is a schematic diagram showing a correlation between the number of triangular columns and brightness.

The brightness of the light reflected from 1608 triangular columns is shown in FIG. 5 where the brightness is inversely proportional to the reflectance. Therefore, the exit light characteristic is such that the middle portion of the light guide is dark as shown by the solid line in FIG. 2.

In order to make the exit light characteristic uniform in the display surface, the area of the slope of the light reflecting triangular column is varied at a rate which is inversely proportional to the brightness. Namely, the area of the slope of the triangular columns comprising the light guide is varied at the rate of 5:3:5 in the incident surface side, middle portion and the opposite end. As a result, a greater uniformity of the distribution of the brightness is obtained in the surface as shown by the dotted line in FIG. 2.

Embodiment 7

Figure 6:
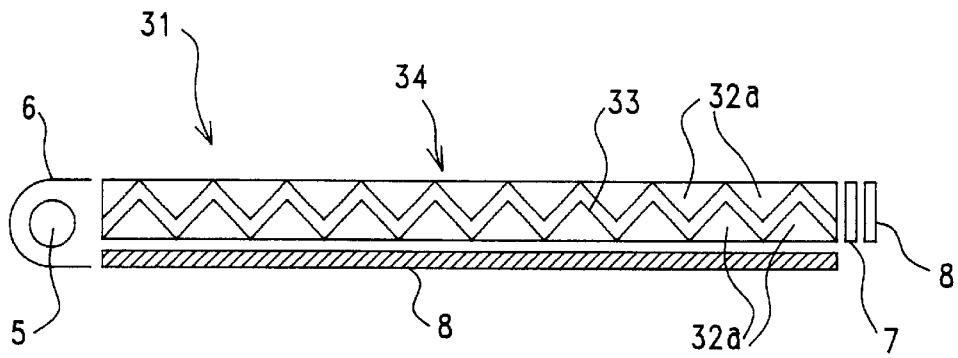
FIG. 6 is a schematic diagram of a 7th embodiment of this invention.
Figure 7:
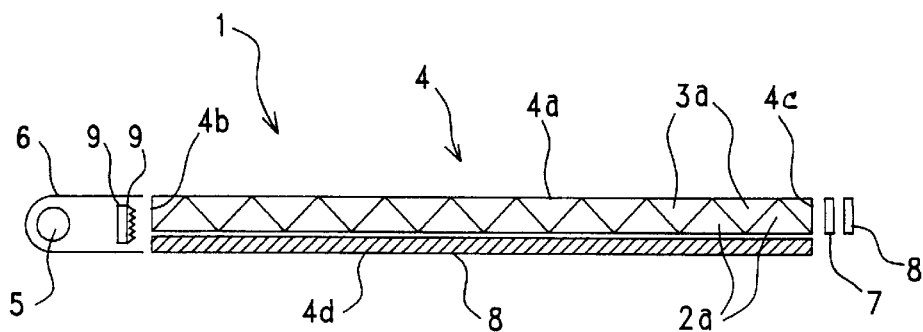
FIG. 7 is a schematic diagram of a 12th embodiment of this invention.

In FIG. 6 which illustrates the embodiment 7, a pair of sheet members is formed from a transparent acrylic resin (the index of refraction N=1.49) which has on one surface thereof an array of a plurality of triangular columns 32a having a cross sectional shape of a right angled isosceles triangle where 3 edges are 1 mm, 1 mm and $\sqrt{2}$ mm and the apex angle is 90 degrees. The pair of the sheet members 32a are formed into a plate member having 16.5 cm width, 21.5 cm length and $1/\sqrt{2}$ mm thickness by filling a photo setting resin (index of refraction n=1.53) in the gap between the sheet members. The plate member is formed into a light guide 34 by machining the sloped edge portions of the plate member into a vertical end surface. The light guide 34 is provided with a lump reflector 6, a quarter wavelength plate 7 and a reflecting sheet 8 in place in the manner similar to the embodiment 1. The plane light source thus formed is the embodiment 7. The feature of the embodiment 7 is a three layered structure in which, for example, a medium B is sandwiched between a medium A to form a media interface rather than a two layered structure of unitary light guides in the preceding embodiments.

Embodiment 8

The embodiment 8 is a plane light source 31 which was prepared in the manner similar to the embodiment 7 except that the pair of the sheet members 32a was made from a transparent acrylic resin (index of refraction n=1.49) and the gap between the sheet members 32a is filled with a transparent resin 33 comprising a transparent photo setting resin compound of triaryl isocyanate and thiol components, and the cross sectional shape of the triangular column of the array is a right angled isosceles triangle having 3 edges of $\sqrt{2}$ mm, $\sqrt{2}$ mm and 2 mm lengths.

Embodiment 9

The embodiment 9 was prepared in a manner similar to the embodiment 7 except that two of the light guide 34 of the embodiment 7 are laminated each other for use as a light guide of this embodiment. The plane light source thus prepared is the embodiment 9.

Embodiment 10

The embodiment 10 was prepared in a manner similar to the embodiment 9 except that two of the light guide 34 of the embodiment 8 are laminated each other for use as a light guide of this embodiment. The plane light source thus prepared is the embodiment 10.

Embodiment 11

The embodiment 11 was prepared in a manner similar to the embodiment 9 except that the index of refraction of the transparent acrylic resin comprising the triangular column which forms the light guide is changed stepwise from 1.50 (end portion), 1.52 (middle portion) to 1.50 (end portion) from the incident surface of the light guide (the end surface in the side of the fluorescent lump) to the opposite end surface (the end in the side of the quarter wavelength plate). The method of changing the index of refraction stepwise is similar to the embodiment 5. The plane light source thus prepared is the embodiment 11.

Embodiment 12

The embodiment 12 is a plane light source which was prepared in a manner similar to the embodiment 1 except that the light guide of the embodiment 5 was used and two sheet members 9 primarily consisting of a polycarbonate each of which is formed with ridges having a cross section of a right angled triangle is provided between the light source 5 and the light guide 4 such that its ridged surface faces to the light guide 4 and the ridges cross in right angle each other. The sheet member 9 functions as a light collecting member to concentrate the angle of the light incident to the incident surface in right angle to the surface.

Embodiment 13

The embodiment 13 is a plane light source which was prepared in a manner similar to the embodiment 12 except that the light guide of the embodiment 11 was used.

Embodiment 14

Figure 8A:
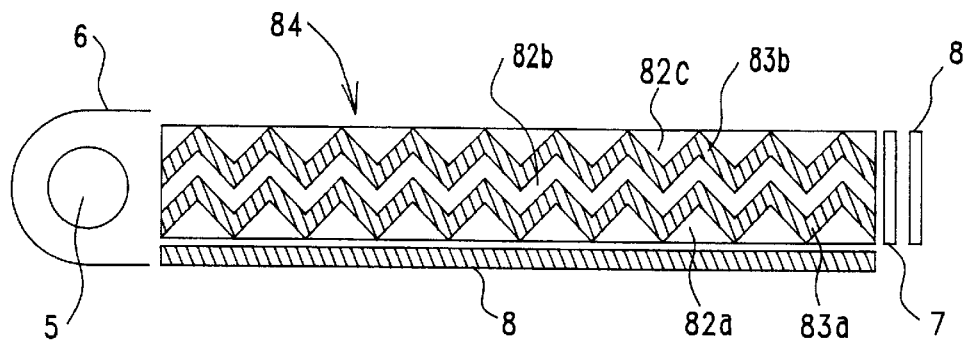
FIG. 8 is a schematic diagram of a 14th embodiment of this invention.

The embodiment 14 is shown in FIG. 8A. A prism sheet 83a (90 degrees apex angle, 500 μm pitch and 550 μm thick) primarily consisting of a UV setting resin having in index of refraction 1.53 is placed on a glass die which is formed with a ridged surface like the prism sheet 83a with intervention of a setting resin compound 82a primarily consisting of a UV setting resin having an index of refraction 1.49 and then set by irradiating a light from the side of the glass die keeping a uniform distance between the die and the prism sheet to form a second prism layer 83a having a continuous W shape and index of refraction 1.49 on the prism sheet 82a having an index of refraction 1.53. Similarly, a third prism layer 82b having an index of refraction 1.53 is formed and a fourth prism layer 83b having an index of refraction 1.49 is formed thereon. Then, the top ridged surface is planarized by being filled with a resin layer 82c having an index of refraction 1.53 to form a light exit surface. Then, the end portion is cut away into a rectangular prism (100 mm×15 mm×about 1 mm) the end surface of which is polished into an optical mirror surface. A fluorescent lump 5 (2.6 mm diameter) is provided externally to the end surface and covered by a lump reflector 6 (silver sheet). A quarter wavelength plate 7 is provided at the end opposite to the end where the fluorescent lump 5 is provided and a silver reflecting sheet 8 provided at the outer side. A silver sheet 8 is provided in other side surfaces and surfaces other than the light exit surface. The plane light source thus prepared is the embodiment 14.

Figure 8B:
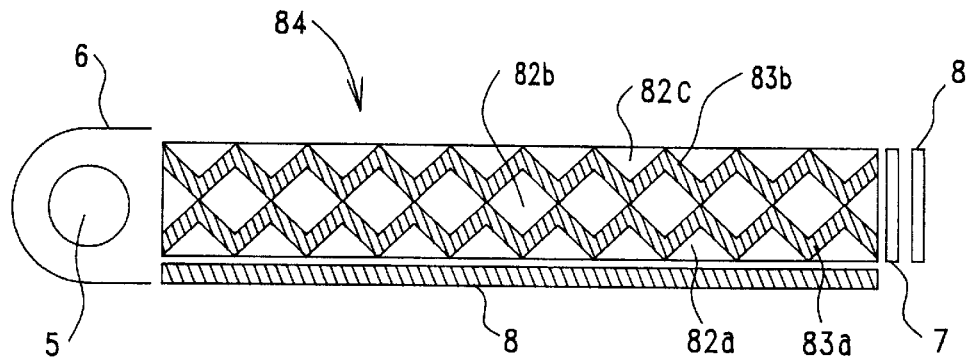

A modification of this embodiment is shown in FIG. 8B. In this modification, the apexes of the triangular column of the second prism layer and the fourth prism layer are in contact each other. A same effect is obtained with such arrangement because an effective media interface is formed as one shown in FIG. 8A.

Embodiment 15

Figure 9:
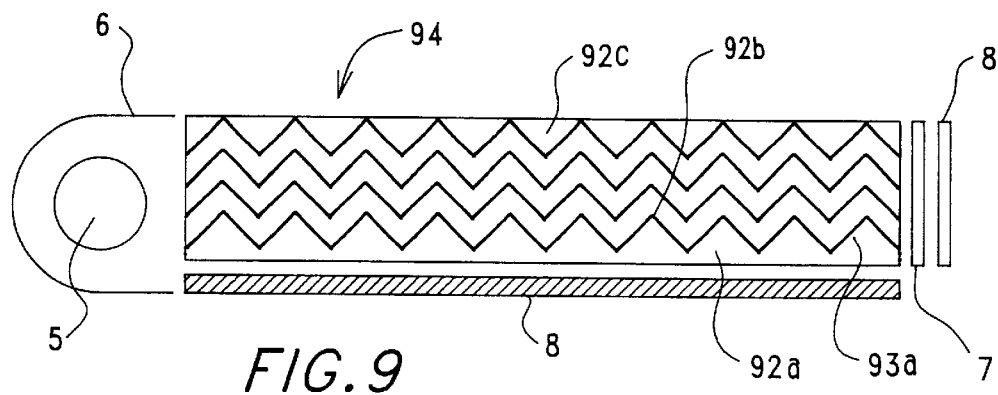
FIG. 9 is a schematic diagram of a 15th embodiment of this invention.

The embodiment 15 is shown in FIG. 9. A prism layer 93 of continuous W shape of 10 μm thick having index of refraction 1.49 and prism layers 92a and 92b of 500 μm thick having index of refraction 1.53 are laminated each other in 7 layers so that the completed light guide has a thickness of 1.0 mm and the top ridged surface is planarized by being filled with a resin layer 92c having an index of refraction 1.53 to form a light exit surface, resulting in a lamination of 9 layers as an entity. The bottom prism sheet has an index of refraction 1.53, 90 degrees apex angle, 200 μm pitch and 120 μm thickness. The plane light source is prepared in the similar manner to the embodiment 11 in other respect and is called the embodiment 15.

Embodiment 16

Figure 10:
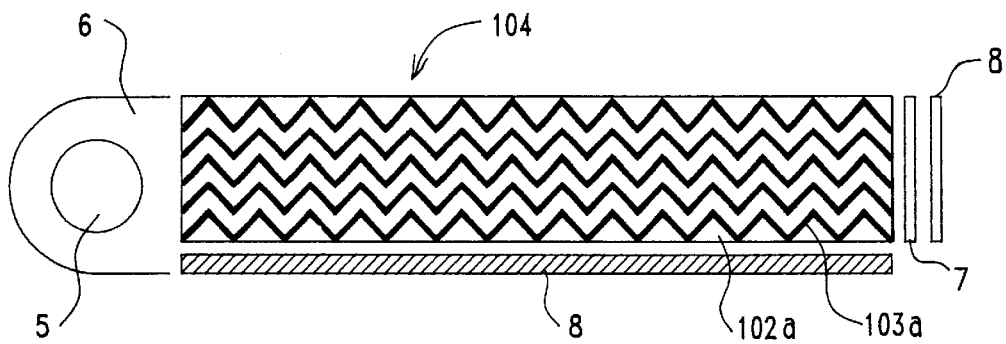
FIG. 10 is a schematic diagram of a 16th embodiment of this invention.

The embodiment 16 is shown in FIG. 10. The pitch of the prism is 200 μm. A layer 102 having an index of refraction 1.49 and a layer 103 having an index of refraction 1.53 are successively laminated into a 10 layered laminate as an entity in which the thickness of the completed light guide is about 1.0 mm. The top ridged surface is planarized by being filled with a resin having an index of refraction 1.49 to form a light exit surface. The bottom prism sheet has an index of refraction 1.53, 90 degrees apex angle, 200 μm pitch and 120 μm thickness. The plane light source is prepared in the similar manner to the embodiment 14 in other respect and is called the embodiment 16.

Embodiment 17

Figure 11:
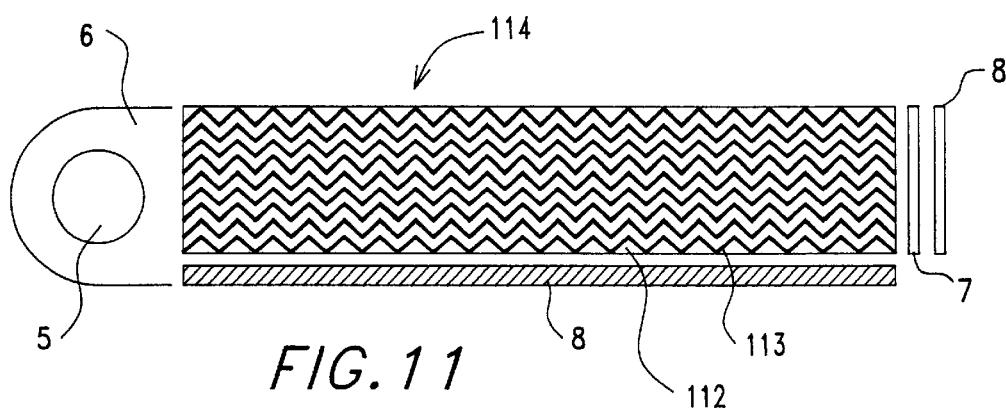
FIG. 11 is a schematic diagram of a 17th embodiment of this invention.

The embodiment 17 is shown in FIG. 11. The pitch of the prism is 200 μm. A layer 113 having an index of refraction 1.49 and 5 μm thickness and a layer 112 having an index of refraction 1.53 and 100 μm thickness are successively laminated into a 17 layered laminate as an entity in which the thickness of the completed light guide is about 1.00 mm. The top ridged surface is planarized by being filled with a resin having an index of refraction 1.53 to form a light exit surface, completing a 19 layered laminate 114 as an entity. The bottom prism sheet has an index of refraction 1.53, 90 degrees apex angle, 200 μm pitch and 120 μm thickness. The plane light source is prepared in the similar manner to the embodiment 11 in other respect and is called the embodiment 17 (14).

Embodiment 18

5 plane light source were prepared according to the embodiments 3, 4, 15, 17, respectively except that the index of refraction of one of the materials comprising the light guide in the embodiment 3, 4, 15, and 17 was frozen to 1.49, and the index of refraction of the other material was changed stepwise from 1.50 (end portion), 1.53 (middle portion) to 1.50 (end portion) from the incident surface of the light guide (the surface in the side of fluorescent lump) to the opposite end (the surface in the side of the quarter wavelength plate). They are the embodiments 18a, 18b, 18c, 18d, of this invention, respectively.

Embodiment 19

Figure 12:
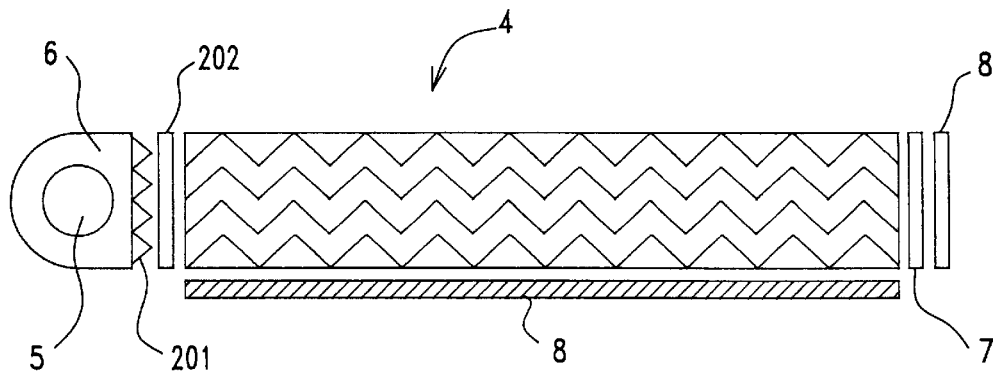
FIG. 12 is a schematic diagram of a 19th embodiment of this invention.

The embodiment 19 is shown in FIG. 12 in which the light guide plate obtained in the embodiment 18 was used and ridges having a cross section of a right angled triangle were formed between the light source and the light guide plate. Sheet members 201, 202 primarily consisting of a polycarbonate were arranged such that the ridged surfaces face to the light guide plate with the ridges being orthogonal each other. These two sheet members 201 and 202 so combined function as a light collecting member. Plane light sources prepared in the manner similar to the embodiment 18 in other respect are called the embodiments 10a, 19b, 19c 19d of this invention, respectively.

Embodiment 20

Figure 13:
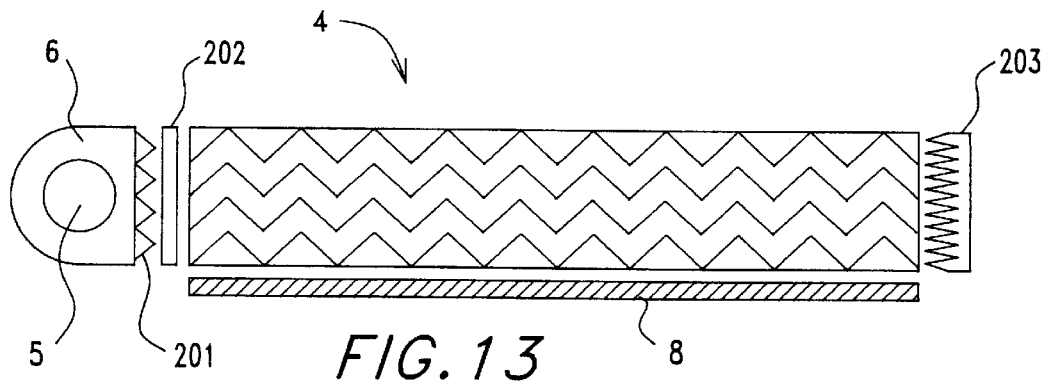
FIG. 13 is a schematic diagram of a 20th embodiment of this invention.

The embodiment 20 is shown in FIG. 13. Plane light sources were prepared in a manner similar to the embodiment 19 except that a sheet member 203 primarily consisting of a polycarbonate which is formed with ridges having a cross section of a right angled triangle is used instead of the quarter wavelength plate and the reflecting sheet which were used for rotating the polarization plane of the second polarized light passing through the light guide plate for re-entrance into the light guide plate in the plane light source obtained in the embodiment 19, said sheet member 203 being arranged such that the apex is oriented toward the light source and the ridges are in 45 degrees with respect to the polarization plane of the second polarized light which has passed through the light guide plate. They are called the embodiments 20a, 20b, 20c, 20d of this invention, respectively.

Embodiment 21

Figure 14:
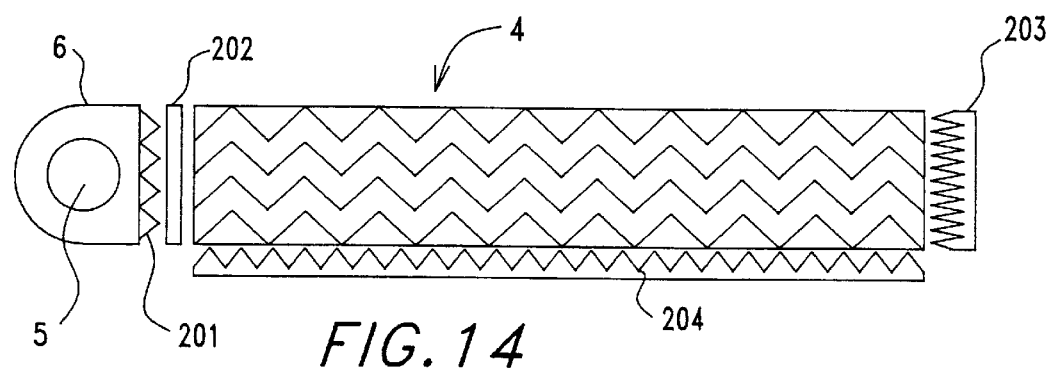
FIG. 14 is a schematic diagram of a 21st embodiment of this invention.

The embodiment 21 is shown in FIG. 14. Plane light sources were prepared in a manner similar to the embodiment 19 except that a sheet member 204 primarily consisting of a polycarbonate which is formed with ridges having a cross section of a right angled triangle is used instead of the reflecting sheet placed in the bottom surface which was the base plane of the light exit surface of the light guide plate, said sheet member 204 being arranged such that the apex is oriented toward the light source. They are called the embodiments 21a, 21b, 21c, 21d of this invention, respectively.

Various other embodiments of this invention are conceivable beside the above embodiments 1 through 21. They are shown in FIG. 15 through 18. In these figures, elements having a same or substantially same structure as the embodiment 1, such as the fluorescent lump 5, the lump reflector 6, the quarter wavelength plate 7 and the reflecting sheet 8, are designated by the reference numbers which are same as FIG. 1 and will not be explained.

Figure 15:
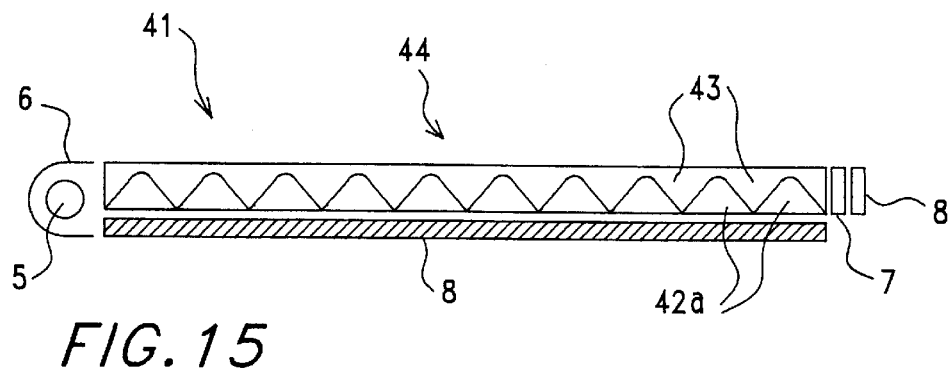
FIG. 15 is a schematic diagram of a 22nd embodiment of this invention.

Among them, FIG. 15 shows a plane light source 41 in which the apex of the upwardly convex triangular column 42a of the light guide 44 is rounded rather than angled and the V groove portions are filled with a photo setting resin 43 (embodiment 22).

Figure 16:
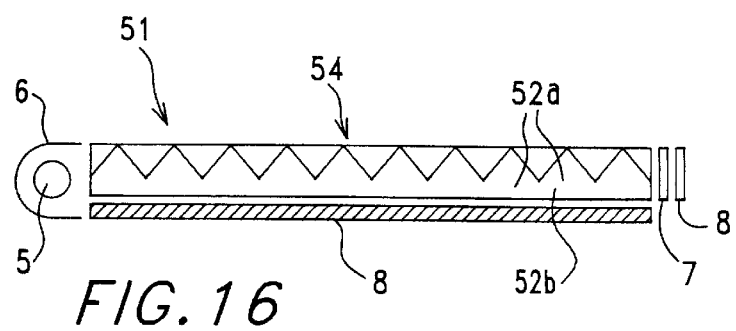
FIG. 16 is a schematic diagram of a 23rd embodiment of this invention.

FIG. 16 shows a plane light source in which a sheet 52b of a constant thickness is provided in the base (the side located in the back side of the light guide) of each triangular column 52a in the light guide 54 (embodiment 23). In this case, an advantage is the ease of manufacturing because a prism sheet may be used. While the function of the light guide 54 shown in this figure is similar to the embodiment 1, the sheet 52*b* invites a loss because it has no polarization separation function.

Figure 17:
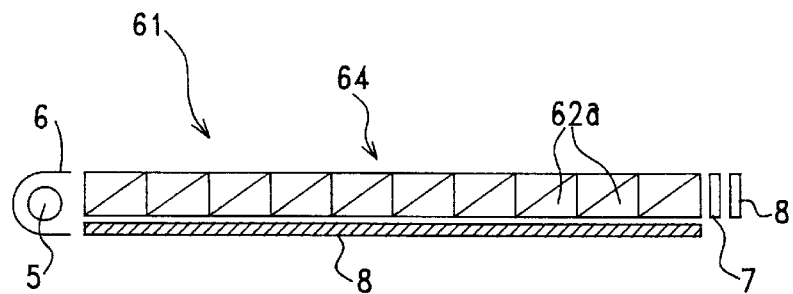
FIG. 17 is a schematic diagram of a 24th embodiment of this invention.

The plane light source 61 shown in FIG. 17 uses a Fresnel lens as a component member of the light guide 64 in which substantially same effect as the embodiment 1 is obtained though the cross sectional shape of the upwardly convex triangular column 62*a* is iequilateral triangle (Embodiment 24).

Figure 18:
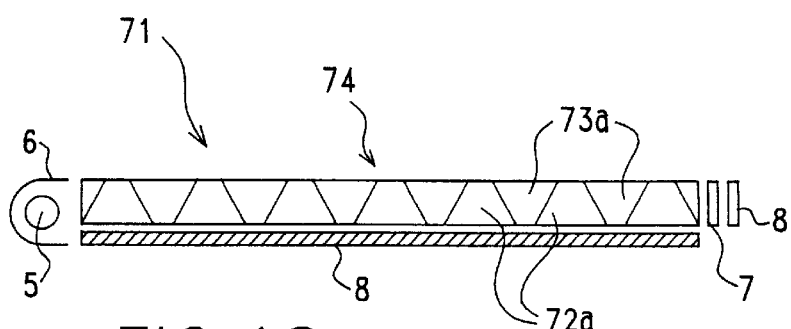
FIG. 18 is a schematic diagram of a 25th embodiment of this invention.

In the plane light source 71 shown in FIG. 18, the cross sectional shape of the ridges 73*a* and 72*a* in the sheet member comprising the light guide 74 is a trapezoid rather than a triangle but a fully same effect is obtained as the embodiment 1 because the slope (interface) of the trapezoid has a same function as the slope of the triangle (Embodiment 25).

Figure 19:
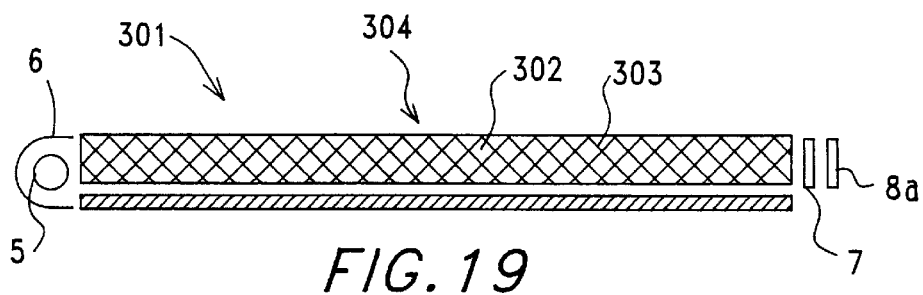
FIG. 19 is a schematic diagram of a 26th embodiment of this invention.

A structure of a novel light guide further conceivable includes a plane light source 301 as shown in FIG. 19 (Embodiment 26). The light guide 304 as shown in FIG. 19 comprises longitudinal blocks 302 of a medium A having a quadrilateral cross section pasted together with a resin adhesive 303 made of a medium B. In this embodiment also, the thickness of the layer of the medium A having an index of refraction 1.49 and a layer of the medium B having an index of refraction 1.53 are 5 $\mu$m and 100 $\mu$m, respectively.

The light guide of the embodiment 26 may by manufactured by the following method, for example. A plurality of square columns of the medium B are prepared and immersed in a monomer solution of the medium A to form them into the structure as shown in FIG. 19. It is then taken out and the medium A is photo-cured into a self supporting shape. It is then cut out in a shape of a plate into a light guide. The example of the monomer of the medium A includes an acrylic resin.

The following comparison examples are used for reference in evaluating the embodiments.

COMPARISON EXAMPLE 1

A light guide of an acrylic resin (100 mm×150 mm×1 mm) having a printed dot pattern on the surface (the surface opposite to the light exit surface) is used. A fluorescent lamp is placed in one side surface which is a light incident surface with the back of the lump covered by a lump reflector and a light diffusion sheet is provided on the back side of the light guide. A light diffusion sheet (beads coating type) is provided on the side of light exit surface of the light guide. Further, two prism sheets formed with a plurality of prisms having an apex angle of 90 degrees are laminated and overlaid on the light diffusion sheet with the ridge lines of the prisms being orthogonal each other. The plane light source thus formed is the comparison example 1.

COMPARISON EXAMPLE 2

A light guide of the comparison example 1 with a thickness 2 mm is used.

COMPARISON EXAMPLE 3

A plane light guide prepared in the following manner (a plane light source disclosed in PUPA 7-64085) is the comparison example 2. A transparent acrylic resin light guide plate (index of refraction n=1.49) of a size of 128 mm×225 mm×2.8 mm is used. One side of the light guide is closely contacted by A 2 W cold cathode discharge tube which is covered by a lump cover in the back thereof. The back side of the light guide is provided with an aluminum reflecting surface which is printed with white ink as a light diffuser. A diffusion plate which is embossed on the surface (polarizing means) and a prism array made of polycabonate are placed on the light exit surface in this sequence. The prism array in this case has a structure in which a plurality of columnar prisms having a cross section of upwardly convex isosceles triangle (with apex angle of 90 degrees) are formed and a dielectric interference film (a single layer of $TiO_2$ film) of a predetermined thickness is coated on the surface of the prisms to act as a polarization separation plane.

The table 1 shows the result of evaluating the plane light sources of the embodiments 1 to 21e and the comparison examples 1, 2 and 3. The items compared includes;

(1) Brightness measurement: A polarization plate is placed on with the optical axis aligned each other and the brightness of the light passing through the polarization plate is measured in the center of the screen.

(2) Transmitted light quantity: A polarization plate is placed on with the optical axis aligned each other and the brightness of the light passing through the polarization plate is measured in this condition.

(3) S component ratio: The ratio of S and P components in the direction viewing the plane light source (the direction standing normal to the light exit surface of the light guide), that is, S/(S+P)×100 (%) was obtained.

(4) Uniformity within the screen: Defining 15 measurement points in the light exit surface of the plane light source, the ratio of the maximum brightness and the minimum brightness of the brightness measured in each point, that is, maximum brightness/minimum brightness×100 (%) was obtained. The uniformity was rated "good" when the ration was equal to or less than 10% while it was rated "poor" when the ration was exceeds 10%.

TABLE 1

| Embodiment | Brightness (cd/m$^2$) | Evaluation | Transmitted Light Q'ty % | S Ratio | Uniformity |
|---|---|---|---|---|---|
| 1 | 1170 | Bright | 76 | 76 | Poor |
| 2 | 1220 | Bright | 72 | 90 | Poor |
| 3 | 1200 | Bright | 71 | 89 | Poor |
| 4 | 1630 | Bright | 80 | 92 | Good |
| 5 | 1200 | Bright | 75 | 90 | Good |
| 6 | 1200 | Bright | 73 | 89 | Good |
| 7 | 1260 | Bright | 73 | 90 | Poor |
| 8 | 1250 | Bright | 75 | 88 | Good |
| 9 | 1380 | Bright | 72 | 90 | Poor |
| 10 | 1370 | Bright | 73 | 89 | Good |
| 11 | 1250 | Bright | 70 | 90 | Good |
| 12 | 1320 | Bright | 77 | 89 | Good |
| 13 | 1380 | Bright | 75 | 91 | Good |
| 14 | 700 | Bright(less) | 70 | 87 | Poor |
| 15 | 950 | Bright(less) | 72 | 90 | Poor |
| 16 | 1000 | Bright(less) | 72 | 88 | Poor |
| 17 | 1100 | Bright | 77 | 92 | Poor |
| 18a | 1200 | Bright | 75 | 90 | Good |
| 18b | 1630 | Bright | 80 | 92 | Good |
| 18c | 1200 | Bright | 72 | 90 | Good |
| 18d | 1500 | Bright | 76 | 92 | Good |
| 19a | 1320 | Bright | 77 | 89 | Good |
| 19b | 1700 | Bright | 82 | 92 | Good |
| 19c | 1250 | Bright | 74 | 90 | Good |
| 19d | 1550 | Bright | 78 | 92 | Good |
| 20a | 1380 | Bright | 78 | 89 | Good |
| 20b | 1750 | Bright | 83 | 92 | Good |
| 20c | 1300 | Bright | 75 | 90 | Good |
| 20d | 1610 | Bright | 79 | 92 | Good |

TABLE 1-continued

Evaluation Item

| Embodiment | Brightness (cd/m²) | Evaluation | Transmitted Light Q'ty % | S Ratio | Uniformity |
|---|---|---|---|---|---|
| 21a | 1450 | Bright | 79 | 89 | Good |
| 21b | 1780 | Bright | 84 | 92 | Good |
| 21c | 1390 | Bright | 78 | 90 | Good |
| 21d | 1700 | Bright | 81 | 92 | Good |
| Comparison Example | | | | | |
| 1 | 870 | Bright(less) | 44 | 91 | Good |
| 2 | 950 | Bright(less) | 65 | 64 | Good |
| 6 | 650 | Bright(less) | 64 | 61 | Good |

It will be seen from the above table that an improved effective utilization of the light is realized according to the embodiments of this invention over the comparison examples (prior art). This is because the most of the light reflected by the slope of the light guide contains solely S component while the absorption of the light is suppressed in the polarization plate which is so placed as to pass S component favorably. In the comparison example 1 and 2, it is considered that the light is bright before it passes the polarization plate but the brightness of the light is eventually lowered after it passes the polarization plate because more than half of the light is absorbed due to the polarization which is not aligned. It is considered that the angle of the light incident to the polarization separating slope is random in the comparison example 3 so that the light which is not incident at Brewster angle results in a loss.

While the light coming from the light source has a highest light intensity in the front thereof because it is basically a scattered light, it contains a variety of components of different angles By orienting the ridge lines of the sheet materials which are formed with ridges having a triangular cross section of apex angle of 90 degrees in right angle each other with the ridged surface being faced to the light guide as shown in the embodiments 12 and 13, the light components directed to various angles other than the right front direction can be re-oriented to the front direction resulting in an increase of the amount of the light in the front direction by 10 to 20 percents in total though 1 to 3 percents of the component in the front direction is lost. As a result, an increased amount of light is incident in an angle near Brewster angle to the slope which is formed by two resins of different indices of refraction so that the amount of light as a plane light source is increased.

An application of the above disclosed light guide and the plane light source to a liquid crystal display device is now shown. The plane light source 1 comprises, for example, the light guide 4 shown in the embodiment 1, the light source 5, the reflector 6, the quarter wavelength plate 7 and the reflecting sheet 8 which have been described in the above. A liquid crystal cell 400 is placed in the side of the exit surface of the plane light source. With respect to the liquid crystal cell 400, the light exiting from the plane light source 1 (shown in an arrow) passes, through a polarization plate 402a and a glass substrate 403 on which TFT 405 and wiring layer 404 are formed, to a liquid crystal layer 410 in which liquid crystal 409 is encapsulated. The orientation of the liquid crystal layer in each picture element is controlled and modulated by the TFT 405 and the wiring layer which are formed on the glass substrate 403. The modulated light passes through the upper glass substrate 406 and is screened or transmitted by the polarization plate 402b. Thus, the transmittance is controlled for each picture cell so as to display a graphic image or letters on the screen in a meaningful pattern. A black matrix layer and a color filter layer are formed on the upper glass substrate 406 as required (not shown). With the light guide and the plane light source of this invention, almost 100 percents of the light from the light source is available so that a bright image is obtained with a reduced power consumption.

Industrial Utility

As described in the above, because the plane light source using the light guide of this invention enables a required polarization light to be emitted directly from the light guide, the portion of the light which was absorbed by the polarization plate in the light incident side of the liquid crystal display device of the prior art is decreased. Thus, a plane light source having an improved light utilization efficiency is realized without using an expensive optical component such as a beam splitter and a condenser lens.

The light guide of this invention and the plane light source using the same can provide a light guide having a very high efficiency of light utilization.

Also, the light guide of this invention and the plane light source using the same can provide a plane light source having a more uniform intensity of exit light of a reduced variance of the brightness distribution depending on the distance from the light source.

It is expected that these effects will be more remarkable when the plane light source of this invention is based on some embodiments which disclosed incidence of the light from the light source at more ideal angle.

A liquid crystal display device having a high brightness and a high image quality is provided with the light guide of this invention and the plane light source using the same. Such liquid crystal display device is most suitable for use in a portable personal computer because it is of a high efficiency of light utilization and low power consumption.

What is claimed is:

1. A planar light guide, comprising:
   a polarization separator having a planar light entrance surface upon which unpolarized light that travels in a propagation direction is incident at a generally a right angle;
   said polarization separator having a planar light exit surface that extends perpendicular to said light entrance surface and parallel to said propagation direction, and from which polarized light exits said polarization separator;
   said polarization separator having a plurality of planar light-refracting interfaces that are located below said light exit surface;
   said light-refracting interfaces comprising a plurality of planes that are inclined to said light exit surface;
   said light-refracting interfaces being formed by a physical engagement of a first and a second sheet of light-transparent material that extend parallel to said light exit surface;
   said first and second sheets of material having different index of refractions;
   said refracting interfaces being formed by a first series of isosceles triangle columns whose apices are directed upward toward said light exit surface, each triangle column within said first series of triangle columns alternating with a second series of isosceles triangle columns whose apices are directed downward and away from said light exit surface;

with height lines that equally divide said apices extending perpendicular to said light exit surface, and with opposite equal length sides of each triangle column extending at an angle of $\theta_B$, +/–20-degrees relative to said propagation direction;

said angle $\theta_B$ being an angle that satisfies Brewster condition; and a difference between the said index of refraction of said two materials being between 0.001 and 1.0.

2. The light guide of claim 1 wherein:

said opposite equal length sides of each triangle column extending at an angle of $\theta_B$, +/–10-degrees relative to said propagation direction; and a difference between the said index of refraction of said two materials is between 0.001 and 0.2.

3. The light guide of claim 1 in which said triangle columns are right-angle isosceles triangle columns such that said angle $\theta_B$ is 45-degrees.

4. The light guide of claim 3 wherein:

said first sheet includes a first plurality of upwardly-directed, right angle, triangle columns having a first index of refraction;

said second sheet includes a second plurality of downward-directed, right angle, triangle columns having a second and different index of refraction; and said first and second sheets physically contacting each ovhther in a column interlocking manner to thereby form said plurality of interfaces.

5. The light guide of claim 4 wherein:

said first sheet is formed of a transparent acrylic resin having an index of refraction of about 1.49; and said second sheet is formed of a transparent photo-setting resin having an index of refraction of about 1.53.

6. The light guide of claim 4, including:

a light source emitting said unpolarized light; and a light-collimating member located intermediate said light source and said light entrance surface.

7. The light guide of claim 4, including:

a first light reflector located adjacent to a first surface of said polarization separator that is opposite to and parallel with said light entrance surface;

a polarization converting member located intermediate said light reflector and said first surface; and a second light reflector located adjacent to a second surface of said polarization separator that is opposite to and parallel with said light exit surface.

8. The light guide of claim 1 including:

a liquid crystal cell located adjacent to said light exit surface, said liquid crystal cell having a plurality of picture elements;

a modulating filter located intermediate said light exit surface and said liquid crystal cell; and a voltage applying mechanism connected to apply a voltage to said picture elements.

9. The light guide of claim 1 wherein said first and second series of isosceles triangle columns form an elongated light-refracting interface having a shape selected from the group W-shape and sine wave shape.

10. The light guide of claim 1 including:

a third series of isosceles triangle columns underlying said second series of isosceles triangle columns and aligned with said first series of isosceles triangle columns, apices of said third series of triangle columns being directed upward toward said light exit surface;

each triangle column within said third series of triangle columns alternating with a fourth series of isosceles triangle columns that underlie said third series of isosceles triangle columns and are aligned with said second series of isosceles triangle columns and whose apices are directed downward and away from said light exit surface.

11. The light guide of claim 1 wherein said difference between the index of refraction of said two materials is less adjacent to said light entrance surface and an opposite end surface of said light guide than it is therebetween.

12. The light guide of claim 1 wherein:

said height lines of said first and second triangle columns are relatively long adjacent to said light entrance surface and an opposite end surface of said light guide and are relatively short therebetween, thereby providing relatively large surface refracting interface surfaces adjacent to said light entrance surface and said opposite end surface of said light guide and relatively small surface refracting interface surfaces therebetween.

13. The light guide of claim 1 including:

a third light transparent sheet of uniform thickness having an index of refraction different than said first and second sheets and positioned between said first and second sheets, said third sheet physically conforming to said apices.

\* \* \* \* \*